(12) United States Patent
Krane et al.

(10) Patent No.: US 6,180,886 B1
(45) Date of Patent: Jan. 30, 2001

(54) METHOD OF ASSEMBLING WIRE HARNESS AND TRIM PANEL

(75) Inventors: Michael A. Krane, Woodhaven; Mike Zuteck, Grosse Pointe Farms; Steve Nagy, Grosse Isle, all of MI (US)

(73) Assignee: Lear Automotive Dearborn, Inc., Southfield, MI (US)

(*) Notice: Under 35 U.S.C. 154(b), the term of this patent shall be extended for 0 days.

(21) Appl. No.: 09/081,802

(22) Filed: May 20, 1998

Related U.S. Application Data

(62) Division of application No. 08/724,733, filed on Sep. 30, 1996, now Pat. No. 5,798,012.

(51) Int. Cl.[7] .................................................. H01B 7/40
(52) U.S. Cl. ............................................ 174/72 A; 174/135
(58) Field of Search ........................... 174/72 A, 71 R, 174/72 C, 72 R, 69, 135

(56) References Cited

U.S. PATENT DOCUMENTS

| | | | |
|---|---|---|---|
| 4,360,400 | 11/1982 | Davis et al. | 156/468 |
| 4,761,871 * | 8/1988 | O'Connor et al. | 29/432.1 |
| 4,853,075 | 8/1989 | Leslie | 156/584 |
| 4,874,908 * | 10/1989 | Johansson | 174/72 A |
| 4,971,647 | 11/1990 | Leslie | 156/249 |
| 5,211,784 | 5/1993 | Haibach et al. | 156/71 |
| 5,467,520 | 11/1995 | Nunez et al. | 29/564.6 |
| 5,535,511 | 7/1996 | Karasik | 29/872 |
| 5,929,382 * | 7/1999 | Moore et al. | 174/72 TR |

FOREIGN PATENT DOCUMENTS

| | | |
|---|---|---|
| 3530413 | 2/1987 | (DE) . |
| 3740593 | 8/1989 | (DE) . |
| 4311188 | 10/1994 | (DE) . |
| 0235924 | 9/1987 | (EP) . |
| 2569146 | 8/1986 | (FR) . |

OTHER PUBLICATIONS

Patent Abstracts of Japan; Publication No.: 03165476; Publication Date: Jul. 17, 1991; Title: Assembling Device For Wire Harness.

* cited by examiner

Primary Examiner—Kristine Kincaid
Assistant Examiner—Adolfo Nino
(74) Attorney, Agent, or Firm—MacMillan, Sobanski & Todd, LLC

(57) ABSTRACT

An improved method and apparatus for assembling a wire harness, and then securing that wire harness to a vehicle trim panel includes the use of adhesive strips. The strips are placed in a welding station prior to the wire harness being assembled through the welding stations. Once the wire harness is fully assembled, the trim panel is placed above the jig. The welding stations are provided with structure to actuate the strips and secure the strips to the trim panel. The strips then capture and hold the wires on the trim panel. In this way, the wire harness may be directly attached to the trim panel after its assembly.

5 Claims, 3 Drawing Sheets

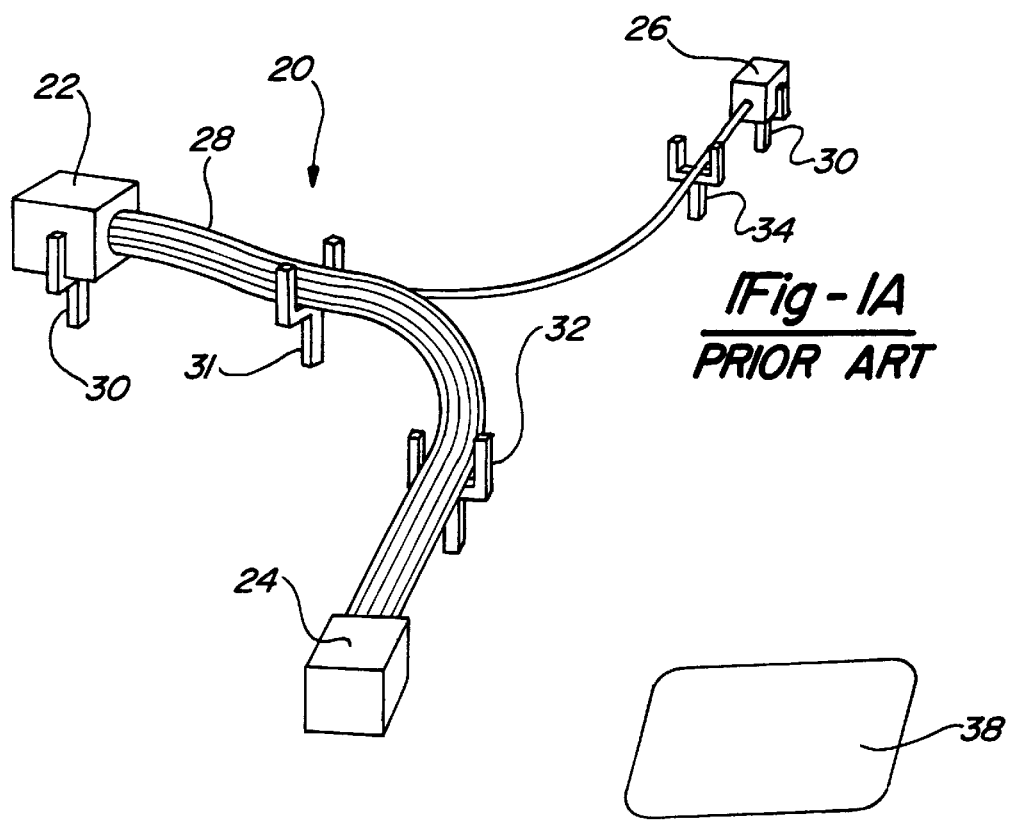
Fig-1A
PRIOR ART
Fig-1B
PRIOR ART
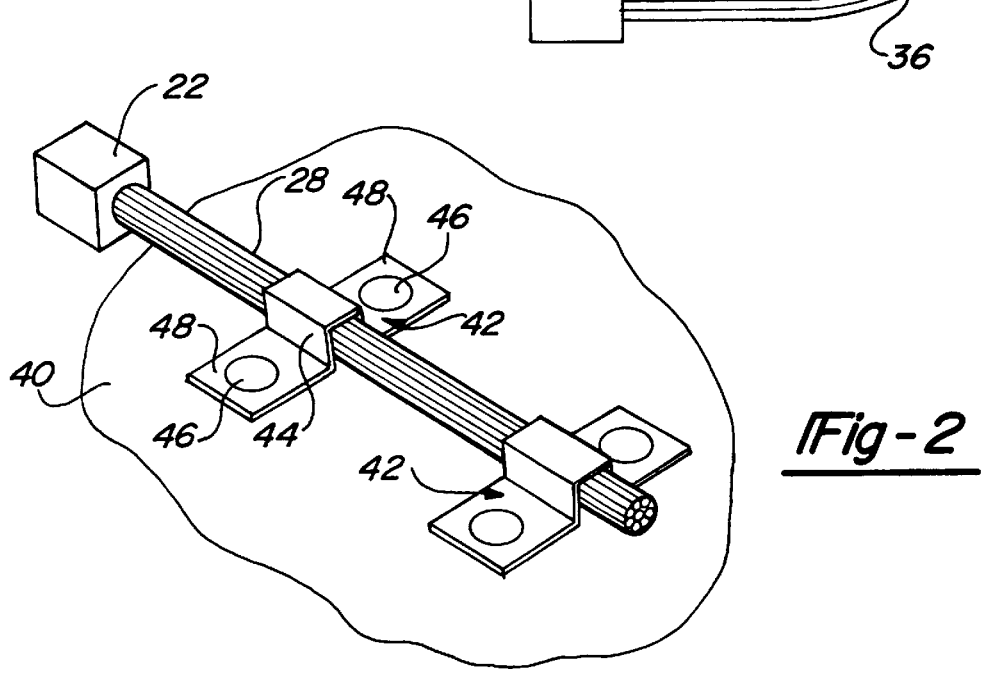
Fig-2

METHOD OF ASSEMBLING WIRE HARNESS AND TRIM PANEL

CROSS-REFERENCE TO RELATED APPLICATION

This application is a divisional of U.S. patent application Ser. No. 08/724,733, filed Sep. 30, 1996, and issued Aug. 25, 1998 as U.S. Pat. No. 5,798,012.

BACKGROUND OF THE INVENTION

This invention relates to an improvement in securing a wire harness to a vehicle trim panel.

In the prior art, wire harnesses are utilized to bundle the control wires associated with vehicle systems. Wire harnesses are assembled at a wiring jig to route the wires to desired destinations, and to connect the wires to connectors as required. As an example, in an interior trim panel for a vehicle door, wires must go to and from a vehicle control, a power supply, and be connected to several components on the vehicle door. Included in the components typically mounted in a vehicle door are window controls, power door locks, and motor driven mirrors. In addition, electrical connections must be made between the vehicle stereo, and any speakers mounted within the door panel. In sum, there are many wires that must be connected into a wire harness for a vehicle trim panel such as a door panel.

The method of assembling a wire harness in the past has required an undesirably large number of steps. It is a goal of vehicle manufacturers to reduce the number of separate steps that must be performed to reach a final vehicle assembly. In addition, it is a goal to form as many modular components, from vehicle components as is possible.

The prior art method of assembling wire harnesses to trim panels has not been as modular as would be desirable. As an example, FIG. 1 shows a highly schematic and very simplified wire harness jig 20. Connectors 22, 24, and 26 are interconnected by wires 28. Routing fork 31 guides wires 28 toward the connectors 24 and 26. Routing fork 32 guides several of the wires to the connector 24, while fork 34 guides a wire to connector 26. As the wire harness is assembled, a worker individually places wires through the routing forks and to their appropriate destinations. The wiring harnesses are then taped to hold desired positions until they can be attached to a trim panel.

FIG. 1B shows the second step in the process of attaching the wire harness 36 to the trim panel 38. The wire harness and trim panel are typically shipped separately to an assembly line, where they are interconnected. Thus, the two processes generally occur at separate locations. Extra manufacturing steps are required to separately transport the wire harness to the trim panel location, and then assemble the two. It would be desirable to reduce the number of separate manufacturing steps.

SUMMARY OF THE INVENTION

In a disclosed embodiment of this invention, welding stations are provided on the jig that are operable to actuate and secure holding strips, and thus captured wires, to the trim panel. In a first embodiment, the holding strips are formed of a material which may be actuated to secure the strip to the trim panel. In one example, the welding stations include ultrasonic members. In other examples the welding station could include vibration or heat applying members.

Initially, a strip is placed in the station. After the wire harness is assembled, similar to as shown in FIG. 1A, a trim panel is placed over the wire harness jig 20. The welding station is then actuated to secure the strips, and thus the wires, to the trim panel.

In one embodiment, a pneumatic cylinder structure drives actuation members and the welding stations to contact the strip and hold the strip against the trim panel. The actuation members are preferably ultrasonic members mentioned above. The actuation members melt the material of the strip to secure the strip to the trim panel.

Preferably, the wire harness is assembled on an assembly line, and the wire assembly and routing occurs at a first station. The assembled wire harness then amoves to a second station at which the trim panel is moved over the jig. At the same time, a pneumatic actuation structure drives the actuation members, which are preferably ultrasonic horns, through openings in a strap holding station, to achieve the welding.

These and other features of the present invention can be best understood from the following specification and drawings, of which the following is a brief description.

BRIEF DESCRIPTION OF THE DRAWINGS

FIG. 1A shows a simplified wire harness jig assembly.

FIG. 1B shows a subsequent step in the attachment of a wire harness to a trim panel.

FIG. 2 is a schematic view of an inventive trim panel.

DETAILED DESCRIPTION OF PREFERRED EMBODIMENTS

Figure 3:
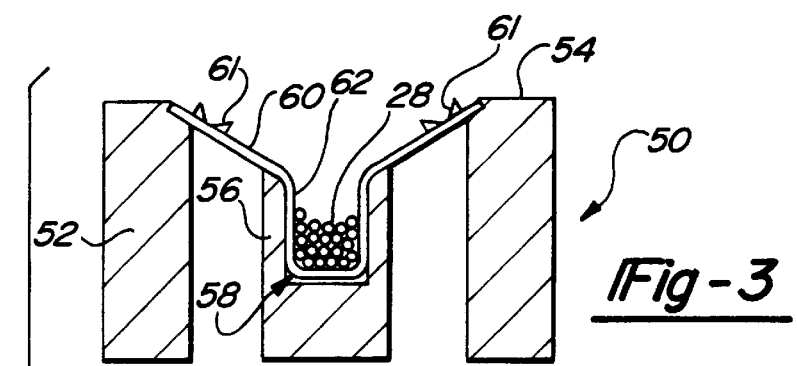
FIG. 3 shows an inventive welding station.

FIG. 2 shows an improved trim panel 40 in which the wire harness is attached directly to the trim panel through a plurality of securement strips 42. Securement strips 42 have a holding channel 44 holding the wires 28 on the trim panel 40 at desired orientations.

The strips 42 include melted portions 46 which secure the strips 42 to the trim panel 40. Portions 46 are preferably formed at outer tabs 48 spaced on opposed sides of the channel 44. The strips 42 are secured to the panel 40 and hold the wires 28 at desired locations.

As will be explained below, with this invention, the assembly of the wire harness to the trim panel is greatly simplified.

FIG. 3 shows welding station 50 to secure the strips 42 to the panel 40. Outer holding surface 52 include holding notches 54. An inner surface 56 includes a seat 58 which receives a strip 60 to be secured to the trim panel. It should be understood that strip 60 is shown in FIG. 3 in its unsecured position, but that strip 60 becomes strip 42 when secured to the trim panel 40. Energy deflection structure 61 is formed on the outer portions of the strip 60. The strip 60 includes a central portion 62 that will become channel 44. A plurality of wires 28 are shown within portion 62.

Actuation horns 63 are placed beneath, and on opposed side of, central holding portion 56. As shown, horns 63 are connected by a base portion 65. An electronic control 66 controls actuation horns 63, and in different embodiments, may cause them to apply ultrasonic force, when the strip 60 is being secured to the trim panel.

A source of pneumatic fluid 68 is shown connected to a cylinder 70 beneath the base 65. The fluid system 60 and 70 is shown somewhat schematically. Other means for driving the horns 63 may replace this system. The electronics 66 are as known in the art, and a worker of ordinary skill in the art would know how to apply ultrasonic force to the horns 63.

Figure 4A:
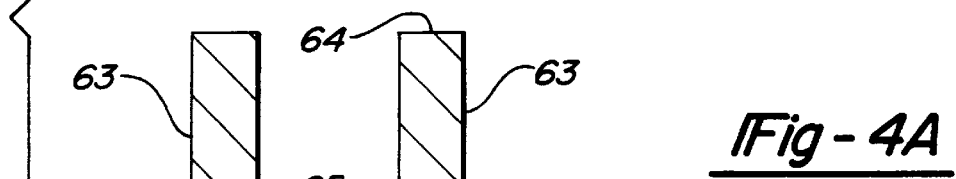
FIG. 4A is a schematic view of the invention applied to securing a wire harness to a trim panel.
Figure 4A:
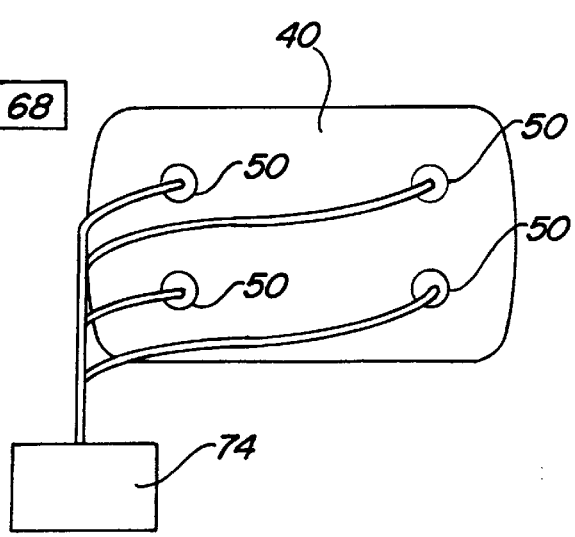
Figure 4B:
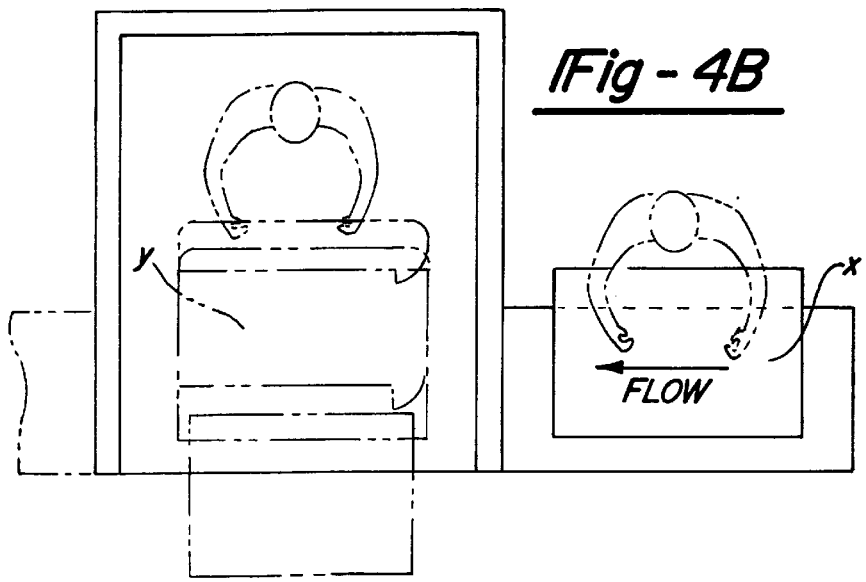
FIG. 4B shows a schematic view of an assembly line for the wire harness.
Figure 4C:
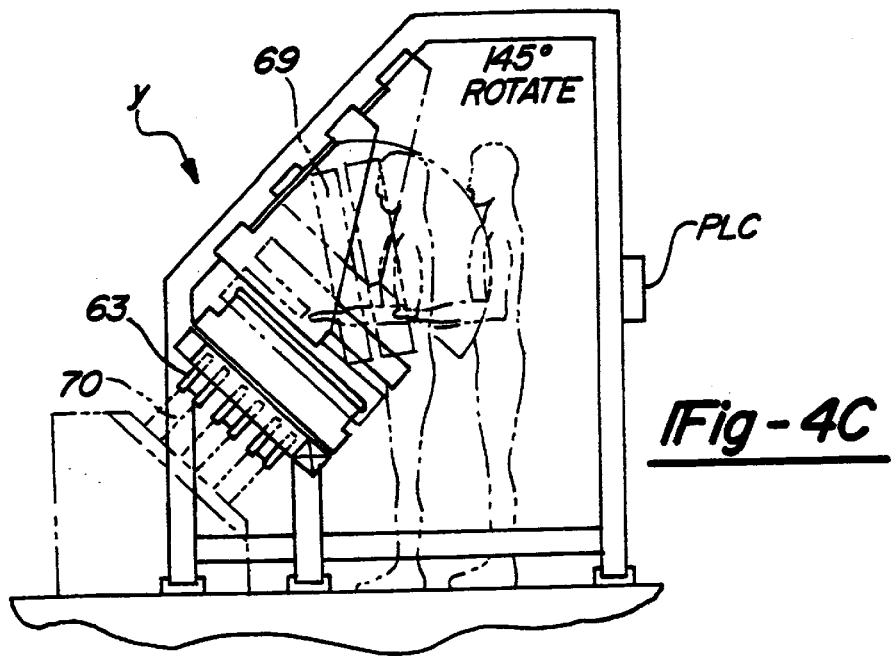
FIG. 4C shows a detail.
Figure 4D:
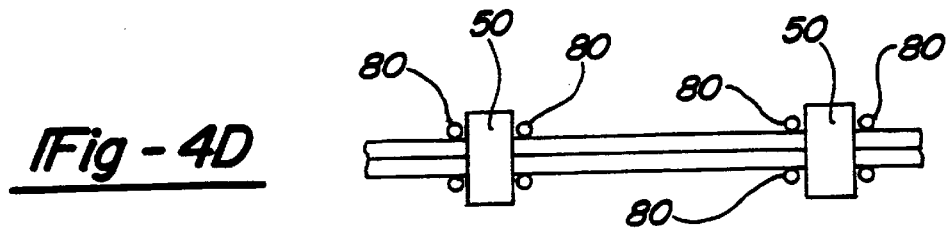
FIG. 4D shows a further detail.

FIG. 4A shows a schematic view of a control 74 for attaching a wire harness to trim panel 40. As shown, a plurality of welding stations 50 are spaced about the trim panel surface 40. As shown in FIG. 4B, the wire harness is assembled at station X, and then moves to station Y. As shown in FIG. 4C, the trim panels are mounted in a rotating carrier member 69 that receives a trim panel which is then rotated to move downwardly on top of the jig. Positioning structure is preferably included to insure that the trim panel 40 is properly located relative to the several routing forks 50. The horns 63 are associated with a cylinder 70 beneath the base of the jig, and beneath the base of a conveyor which brings the jig into the station Y. Now, when it is desired to achieve the welding at the station Y, the horns 63 are driven upwardly. As shown in FIG. 4D, the welding stations 50 are preferably associated with routing forks 80 on each side of the welding stations. Alternatively, it should be understood that the welding stations themselves may be able to provide the routing function. Control 74 actuates the horn to cause the horns 63 to move forwardly, and to then actuate the adhesive on the strip 60 to secure the strip 60 to the trim panel.

Figure 5:
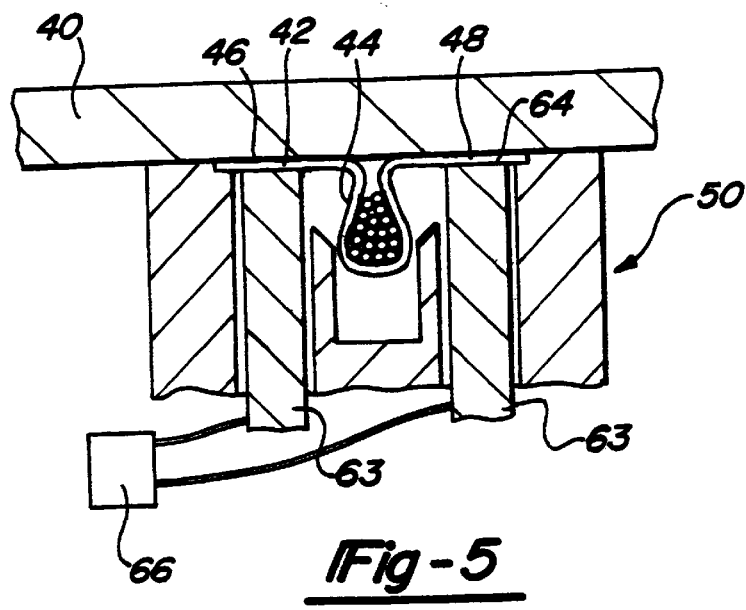
FIG. 5 shows an actuation step of the present invention.

FIG. 5 shows the actuation step. As shown, the horns 63 have been driven forwardly such that their tips 64 contact the strip and have forced outer tabs 48 against the trim panel 40. This squeezes the channel on the wires such that the wires are held securely. The portion 61 as shown in FIG. 4 has now been melted and formed the melt portions 46 as shown in FIG. 2. The tips 64 may apply ultrasonic force to melt the plastic. Alternatively, the horns may apply heat or vibration. The controls and structure for achieving any one of these actuations systems are as known in the art. It is the use of such a system with the inventive application which is the patentable feature of this invention.

The present invention has simplified the assembly of a wire harness to a trim panel. Once the wire harness is assembled in a jig such as shown in FIG. 1A, the trim panel is then placed over the assembly. The welding stations 50 are then actuated to secure the strips 42 to the trim panel 40. In this way, the intermediate step of transporting the wire harness to the trim panel assembler, and then securing the two is eliminated. Less assembly time is required, and fewer components need be stored.

In one embodiment, the strips 42 are preferably formed to be compatible with the material of the trim panel 40. If the trim panel 40 is formed of a material then the strip 42 is preferably formed of the same material. The energy deflection portion ensures an evenly melted strip.

In preferred embodiments of this invention, the strip could be a polyproplyene, or of A.B.S. plastic. Again, it is the material of the trim panel which will dictate the selection of the material for the strip.

Preferred embodiments of this invention have been disclosed, however, a worker of ordinary skill in the art would recognize that certain modifications will come within the scope of this invention. For that reason, the following claims should be studied to determine the true scope and content of this invention.

What is claimed is:

1. A trim panel and integral wire harness assembly comprising:

a panel to be mounted to a vehicle, said panel having a first trim side to be displayed for view and an opposed second side to be concealed from view when said panel is mounted in the vehicle;

a wire harness positioned adjacent said second side of said panel; and at least one securement strip having a holding channel extending partially about said wire harness, said securement strip having outer tabs extending from said holding channel to form opposite ends of said securement strip, each said outer tab being securely welded to said second side by a melted energy deflection structure of said outer tab whereby said securement strip holds said wire harness on said second side of said panel.

2. The assembly according to claim 1 wherein said energy deflection structures extend from said outer tabs toward said second side prior to being melted.

3. The assembly according to claim 1 wherein said holding channel extends from said second side in an inverted U-shape.

4. A trim panel and integral wire harness assembly comprising:

a panel to be mounted to a vehicle, said panel having a first trim side to be displayed for view and an opposed second side to be concealed from view when said panel is mounted in the vehicle;

a wire harness positioned adjacent said second side of said panel; and a plurality of spaced securement strips each having a holding channel extending partially about said wire harness, each said securement strip having outer tabs extending from said holding channel to form opposite ends of said securement strip, each said outer tab being securely welded to said second side by a melted energy deflection structure of said outer tab whereby said securement strips hold said wire harness on said second side of said panel.

5. The assembly according to claim 4 wherein said energy deflection structures extend from said outer tabs toward said second side prior to being melted.

* * * * *